United States Patent [19]

Huber et al.

[11] Patent Number: 5,742,132
[45] Date of Patent: Apr. 21, 1998

[54] METHOD AND SYSTEM FOR STARTING AND OPERATING A DISCHARGE LAMP

[75] Inventors: Andreas Huber, Maisach; Dieter Lang, Bruckmuehl, both of Germany

[73] Assignee: Patent-Treuhand-Gesellschaft F. Elektrische Gluehlampen mbH, Munich, Germany

[21] Appl. No.: 622,519

[22] Filed: Mar. 25, 1996

[30] Foreign Application Priority Data

Apr. 27, 1995 [DE] Germany ............... 195 15 511.4

[51] Int. Cl.⁶ ........................................ H05B 37/02
[52] U.S. Cl. ............... 315/209 R; 315/220; 315/308; 315/DIG. 5; 315/DIG. 7
[58] Field of Search ................. 315/82, 220, 224, 315/209 R, 234, 291, 308, DIG. 5, DIG. 7, 244

[56] References Cited

U.S. PATENT DOCUMENTS

| | | | |
|---|---|---|---|
| 4,792,887 | 12/1988 | Bernitz et al. | 363/89 |
| 4,912,374 | 3/1990 | Nagase et al. | 315/244 |
| 5,017,839 | 5/1991 | Arlt et al. | 315/219 |
| 5,198,728 | 3/1993 | Bernitz et al. | 315/307 |
| 5,365,151 | 11/1994 | Spiegel et al. | 315/209 R |
| 5,396,152 | 3/1995 | Boenigk | 315/241 R |
| 5,481,162 | 1/1996 | Boenigk et al. | 315/307 |
| 5,483,126 | 1/1996 | Boenigk et al. | 315/307 |
| 5,514,935 | 5/1996 | Oda et al. | 315/82 |

FOREIGN PATENT DOCUMENTS 0 485 865 A1  5/1992  European Pat. Off. .

*Primary Examiner*—Robert Pascal
*Assistant Examiner*—Haissa Philogene
*Attorney, Agent, or Firm*—Frishauf, Holtz, Goodman, Langer & Chick, P.C.

[57] ABSTRACT

To effectively suppress glow discharge of a discharge lamp, especially a high-pressure discharge lamp, immediately after starting or firing, the lamp is supplied in a second, or run-on phase with a run-up current which has a form factor F greater than one (1), for example 1.13 to 1.45, and which has an effective value $I_{eff}$ which is higher than the rated normal operating current of the lamp. A control circuit (C), coupled to a controllable power supply, and to a switchable bridge circuit, controls the frequency of the run-on phase current to be higher than the normal operating frequency, for example about 2 kHz with a normal operating frequency between about 90–150 Hz.

14 Claims, 4 Drawing Sheets

METHOD AND SYSTEM FOR STARTING AND OPERATING A DISCHARGE LAMP

Reference to related patents and applications assigned to the assignee of the present invention, the disclosures of which are hereby incorporated by reference:
U.S. Pat. No. 4,792,887, Bernitz et al.
U.S. Pat. No. 5,198,728, Bernitz et al.
U.S. Pat. No. 5,396,152, Boenigk
U.S. Pat. No. 5,481,162, Boenigk et al.
U.S. Pat. No. 5,483,126, Boenigk et al.
U.S. application Ser. No. 08/539,882, filed Oct. 6, 1995, Bernitz et al.
U.S. application Ser. No. 08/604,420, filed Feb. 21, 1996, Osterried et al.
U.S. application Ser. No. 08/610,634, filed Mar. 4, 1996, Osterried et al.
U.S. application Ser. No. 08/622,563, filed Mar. 25, 1997, Huber et al.

Reference to related publication assigned to the assignee of the present invention:
European 0 485 865 A1, Bernitz et al.

FIELD OF THE INVENTION

The present invention relates to a method for starting and operating a discharge lamp, especially a high-pressure discharge lamp, and to a system for starting and operating such a discharge lamp which utilizes the method.

BACKGROUND

Discharge lamps, and particularly high-pressure discharge lamps are started, in accordance with a state of the art, by providing the lamp with a low-frequency square-wave voltage of, for example, between about 90-150 Hz. Ignition pulses are superimposed over this voltage. As soon as the lamp ignites or fires, the operating frequency of the lamp voltage and the lamp current is reversed in polarity, not later than after a half period of the nominal frequency. At the nominal frequency of 90 Hz, this polarity reversal will occur after 5.5 ms. At this instant of time, however, the electrodes will have a temperature which does not permit thermal emission from the electrodes. Upon polarity reversal of the lamp voltage and the lamp current, the lamp has the tendency to extinguish or, alternatively, to operate for a few milliseconds in a glow discharge with a relatively high operating voltage of, for example, between about 150–200 V.

Any glow discharge has numerous disadvantages. A glow discharge not only contributes the substantial material removal from the then activated electrode. This so removed material deposits on the bulb of the lamp, leading to blackening thereof. Additionally, the glow discharge also decreases the light flux. These undesirable results of a glow discharge occur at each polarity reversal.

The current supply to the lamp has a square-wave shape, which means that the current will have a form factor of about one (1). This causes high thermal loading on the electrodes at this initial operating state which could be heated even to their melting temperature. The loading is then particularly high when the run-on currents occur in the discharge lamp which are substantially over the rated operating currents. This is a disadvantage of currents supplied with a form factor of about 1.

"Form factor" is defined (Van Nostrand's Scientific Encyclopedia, 5th Edition, 1976) as the ratio of the root-mean-square (effective) value of the current or signal to its average value. For signals having no constant (dc) component, the half period average is the value used in evaluating the ratio. The form factor is smaller for a signal with a flat top than for one which is peaked. The factor has a value of 1.111 for a sine wave, and 1.000 for a squarewave. The form factor, thus, can be used as a description of the shape of a periodic signal. The form factor F can be expressed mathematically as the ratio of the effective value of current $I_{eff}$ or signal to the rectified value of the current $I_{gl}$ or signal, namely $$F = \frac{I_{eff}}{I_{gl}} . \tag{1}$$

THE INVENTION

It is an object to provide a method and a system carrying out the method which permits run-on or starting operation of a discharge lamp in which the electrodes of the discharge lamps are only lightly loaded.

Briefly, the lamp is first started with ignition pulses in a first or ignition phase and then, in a second, or run-up phase the lamp is supplied with a run-up phase current which, in accordance with a feature of the invention, has an effective value $I_{eff}$ which is higher than the rated normal operating current; and wherein the run-up phase current supplied to the lamp has a form factor greater than one, or unity (1) and, preferably over 1.1, for example 1.13 or, even better, 1.45.

The invention has a number of advantages and, for example, and principally, that the lifetime of the discharge lamp is substantially increased since the electrodes are heated during the run-on or run-up operating phase effectively to the required emission temperature. Further, the run-on current can be increased so that the light flux output will also rise quickly without, however, damaging the electrodes.

DRAWINGS

DETAILED DESCRIPTION

Figure 1:
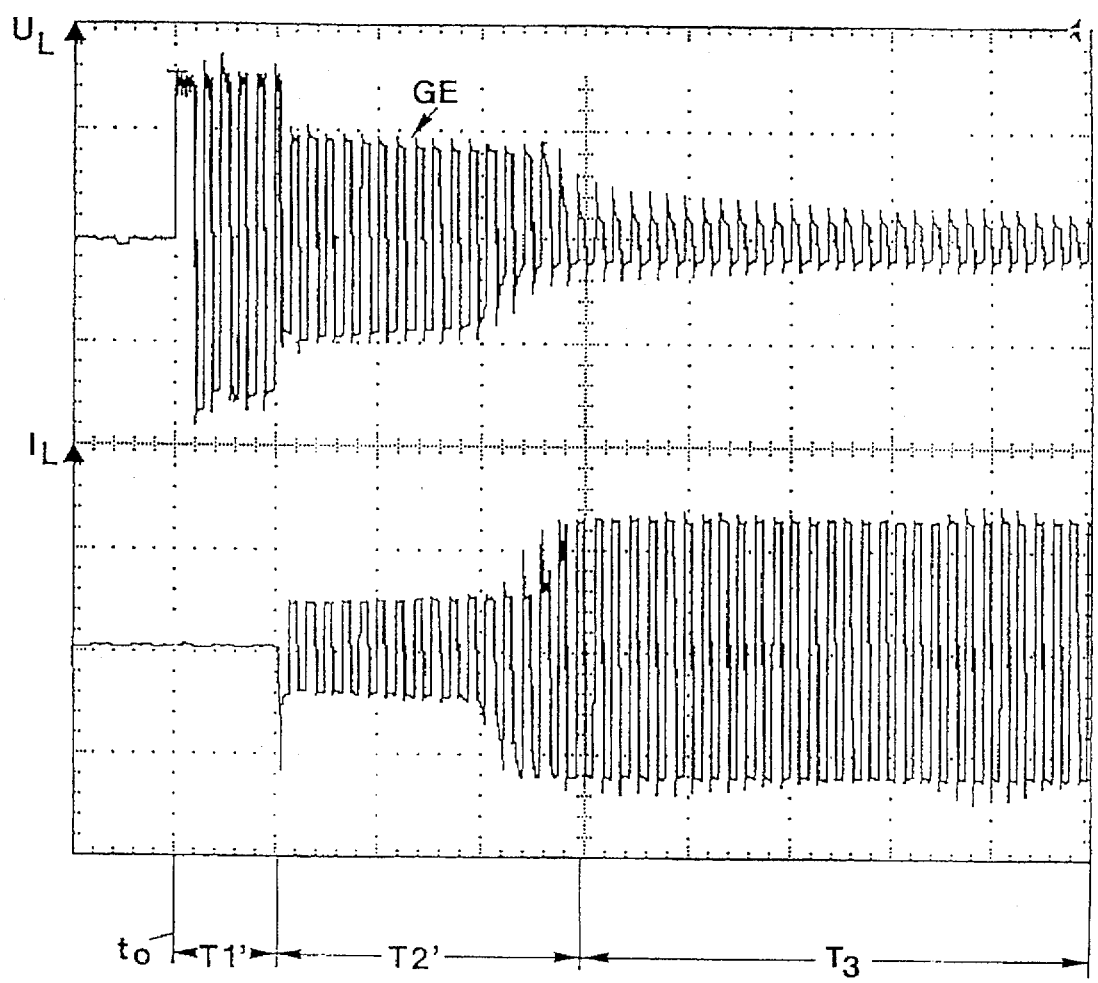
FIG. 1 is a timing diagram of voltage and current supplied to a high-pressure discharge lamp upon starting, in accordance with the prior art.

Discharge lamps, and particularly high-pressure discharge lamps, are supplied, in accordance with the prior art, at the beginning of energization at a time $t_o$ (FIG. 1) with an alternating voltage of nominal frequency of, for example, between 90 and 150 Hz. FIG. 1 schematically illustrates the current and voltage diagrams; the upper portion of FIG. 1 shows the lamp voltage $U_L$ with a scale of 200 V per unit, and the lower portion of FIG. 1 shows the lamp current $I_L$, at 2 A/unit. The ignition pulses are not shown.

In the operating mode according to the prior art, the lamp supplies the voltage $U_L$ at nominal frequency at the beginning of the time $t_o$, that is, when the voltage $U_L$ is connected. In the time interval T1', ignition pulses are superimposed over the nominal frequency. These ignition pulses have an amplitude of from 4 to 4.5 kV and a time duration of about 1–2 microseconds. Consequently, FIG. 1 cannot show these pulses. One time unit in FIG. 1 is 50 milliseconds. In a subsequent time period T2', glow discharges GE occur during the polarity reversals of the lamp voltage. These glow discharges can occur until the electrodes have reached emission temperature, which is the end of the time interval T2'. Typical values for glow discharges are in the range of from about 150 to 250 V. Each glow discharge results in material removal from the electrode which, at the specific time instant, forms the cathode. This material is deposited on a lamp bulb resulting in blackening thereof.

A time period T3 then follows, adjoining the time period T2', during which the lamp voltage rises from 10 to 20 V to its nominal rated value, and the lamp current drops to its rated value. The waveform of the voltage $U_L$, following the time interval T1', is a square-wave, and thus has a form factor F=1.

The following relationships obtained:

$$F = \frac{I_{\it eff}}{I_{gl}} \quad (1)$$

$$I_{\it eff} = \frac{1}{T} \sqrt{\int_0^T (I(t))^2 dt} \quad (2)$$

$$I_{gl} = \frac{1}{T} \int_0^T |I(t)| dt \quad (3)$$

wherein $I_{\it eff}$ is the effective value of the current and $I_{gl}$ is the rectified value, and T is the period.

In accordance with a feature of the present invention, the lamp is supplied after its ignition, and during a first short interval in the run-up operating condition, with a current of an effective value $I_{\it eff1}$ which is higher than the effective value of the nominal current in ordinary operation, which normal operation or phase follows the run-up phase. The power supply to the lamp is increased in this run-on operation above the power rating of the lamp.

In accordance with another feature of the present invention, the current supplied during the run-on phase and after ignition is selected to have a wave shape, such that the form factor F is greater than one (1), and preferably as high as can be obtained by commercially suitable circuit elements.

Figure 2:
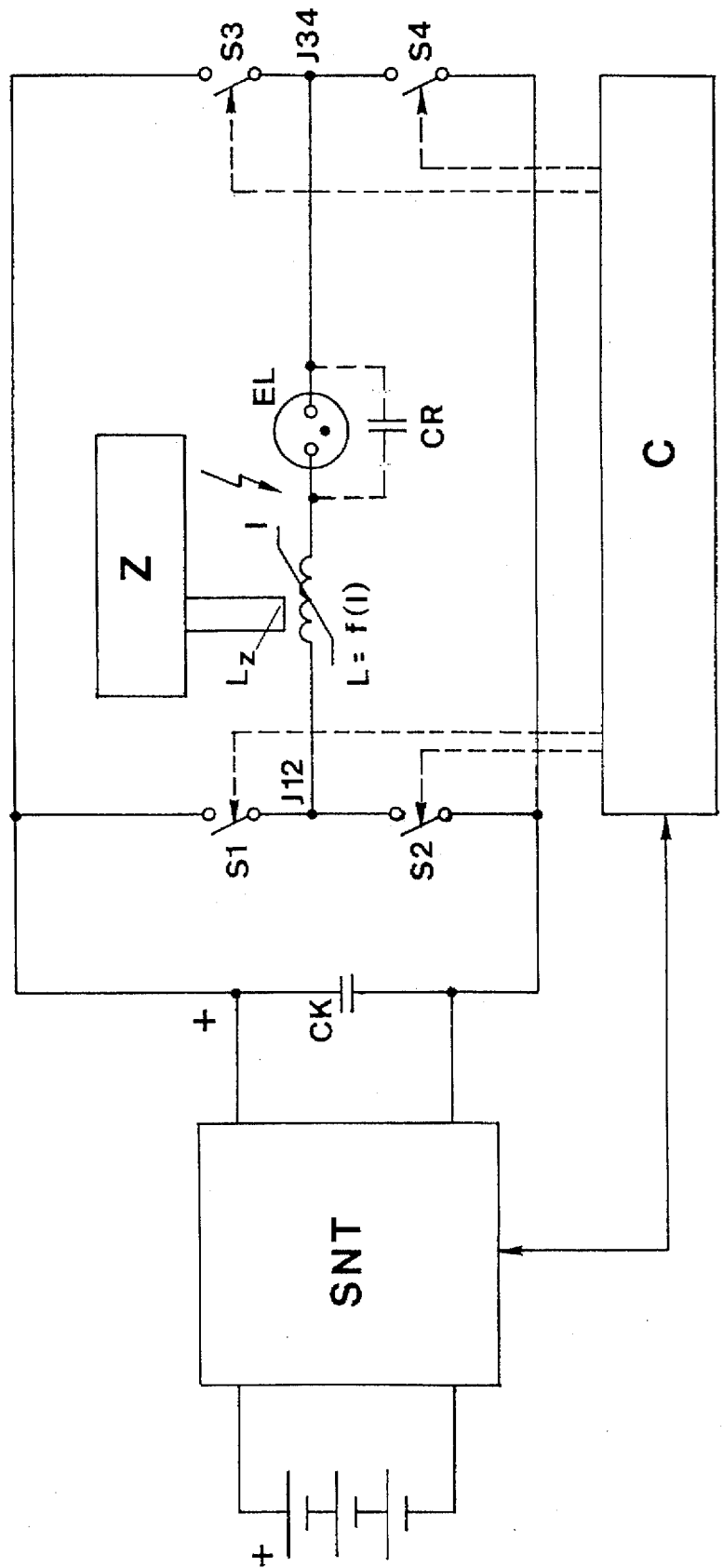
FIG. 2 is a highly schematic diagram of a circuit in accordance with the present invention.

During the run-on phase of the lamp, the frequency of the lamp current is selected to be higher than the frequency of the current during normal continuous operation. FIG. 2 illustrates a circuit configuration which provides for a form factor which is greater than one (1).

Referring now to FIG. 2: the circuit is supplied from a direct current source, which may be the output of the rectifier and, at its input, has an input circuit SNT formed by a switched-mode power supply circuit. At the output, the circuit SNT is coupled to a capacity, shown schematically by capacitor CK. A bridge circuit is connected in parallel to the capacity and, for example, a full-wave, push-pull bridge with switches S1, S2, S3, S4. The junctions J12 and J34 between the switches S1, S2 and S3, S4, respectively, are connected by the lamp EL, in series with an inductance L.

The discharge lamp EL can be fired or ignited by an ignition circuit Z which can be coupled inductively by an additional winding $L_Z$ on the inductance L. Alternatively, the lamp can be fired by a capacitor CR connected in parallel to the discharge lamp EL and, together with the inductance L, forming a series resonance circuit. The capacitor CR may be used, even in combination with the additional firing circuit Z.

The switches S1, S2, S3, S4 are controlled from a control circuit C. The control circuit C receives control input from the switched-mode power supply SNT, which forms the voltage supply for the discharge lamp, and which also can regulate the power supplied to the discharge lamp. To regulate the power, the voltage U at the output terminals of the circuit SNT is measured, and the current I flowing in the output circuit likewise is measured. The respective voltage and current values are multiplied and a signal representative of the actual power is supplied to the control circuit C. The control circuit can raise the actual or commanded value of the output power from the circuit SNT during the run-on phase of operation of the lamp by a suitable control of the duty cycle of the switches S1–S4.

The control circuit C also controls the bridge arrangement of the switches in accordance with the present invention; the discharge lamp, in a run-on state and after firing, will receive a current with an effective value $I_{\it eff1}$, which is higher than the effective value of the nominal or rated current of the lamp which is supplied to the lamp in normal or operating state or operating phase. The form factor of the current supplied to the discharge lamps, in the run-on state, is greater than one (1). The current supplied to the discharge lamp, in the run-on state, has a rectified value $I_{gl}$ as low as possible. The current supplied in the run-on state has an operating frequency which is higher than the operating frequency in a nominal or steady state operation, which is a second operating phase after a first or run-on operating phase.

The control circuit C of the circuit in accordance with the present invention, thus, controls the switches S1–S4 of the bridge circuit to operate in complimentary manner with a relative high operating frequency; in the second operating state, that is, normal operation, the frequency of operation of the bridge circuit S1–S4 is a relatively lower frequency.

The initial operating phase terminates when the voltage of the discharge lamp has reached its nominal, design, or steady state value. The control circuit C detects this operation, and the further operating phase then follows in which the power of the lamp is adjusted to the nominal value. The operating frequency of the bridge circuit is changed to a relatively low nominal value or design value frequency which is, especially, below the acoustic resonances of the discharge lamp to insure quiet operation.

Figure 4:
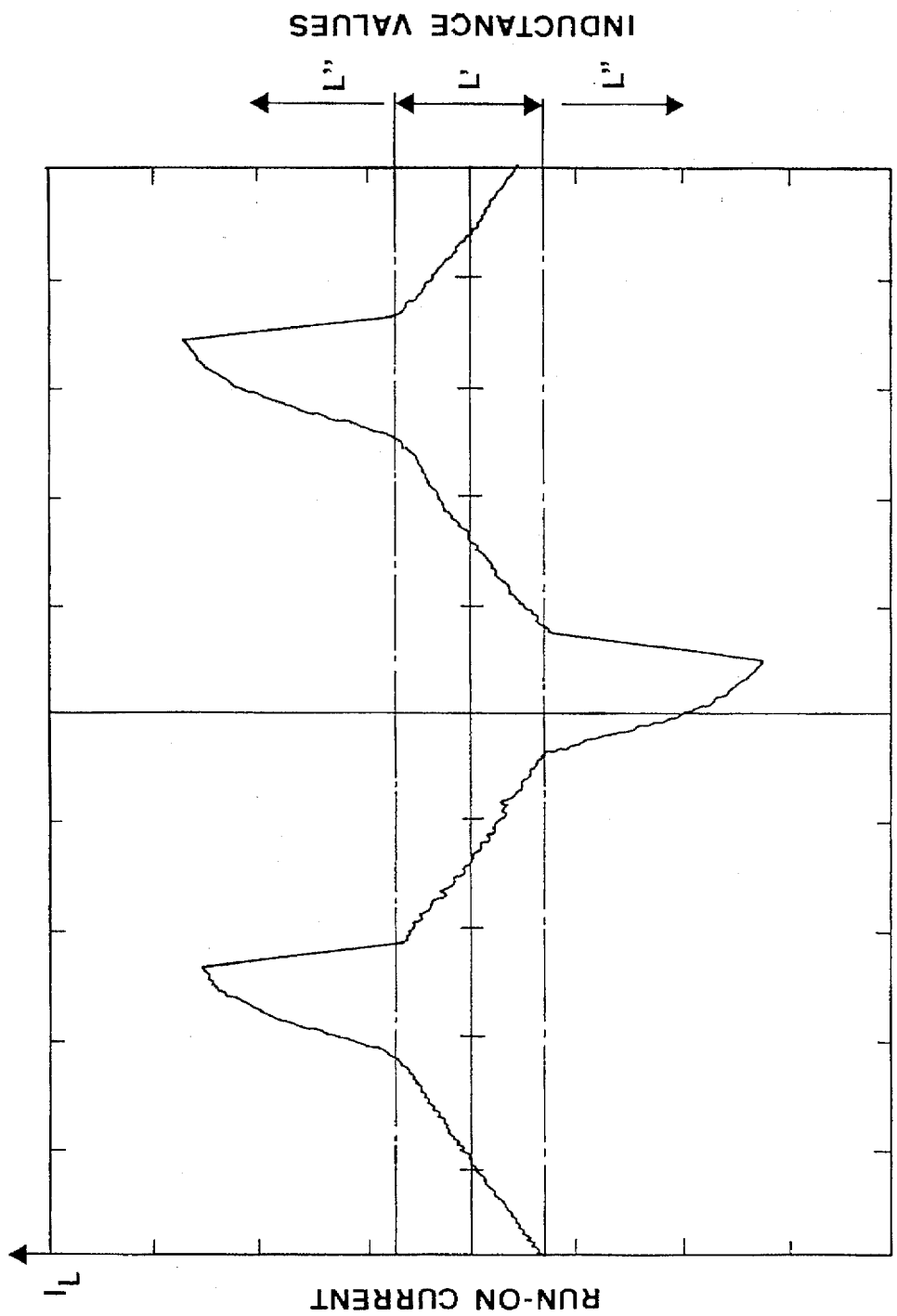
FIG. 4 is a diagram of the course of current in the run-on operating state in accordance with the present invention, and when using a non-linear inductance.

The inductance L can be so constructed that, during the relatively high operating current in the run-on state, it operates under saturated condition. When the inductance L in the circuit in accordance with the present invention does not operate within the range of saturation, an essentially triangular lamp current will result which has a form factor of about 1.13, with respect to a square-wave current, which has a form factor F=1. This decreases the loading of the electrodes by 13%. When the inductance L in the circuit of the present invention is operated in the range of saturation, then in the first operating state, a lamp operating current can be commanded, which has a waveform as shown in FIG. 4. This lamp current has a form factor of about 1.45 with respect to a square-wave current of F=1. This decreases the loading of the electrodes by 45%.

In accordance with a feature of the invention, the inductance L is so dimensioned that it saturates when the current reaches about 2 to 3 times the effective value of nominal operating current. The inductance, preferably, is a non-linear inductance.

The substantial decrease of the effective permeability and the resulting decrease of the effective inductance L in the lamp circuit permits the lamp current to rise relatively strongly. The decrease of the effective permeability is caused by the high operating current.

By suitable dimensioning of the parameter L at nominal operating current, saturation current, and operating frequency of the bridge circuit S1–S4, form factors of different values and levels may be obtained.

For circuit details of the circuit SNT, ignition of the lamp and change of inductance values, reference is made to U.S. Pat. No. 5,396,152, Boenigk; U.S. Pat. No. 5,483,126, Boenigk et al.; and to U.S. application Ser. No. 08/622,568, filed Mar. 25, 1996, Huber et al, the disclosures of which are all incorporated by reference.

Figure 3:
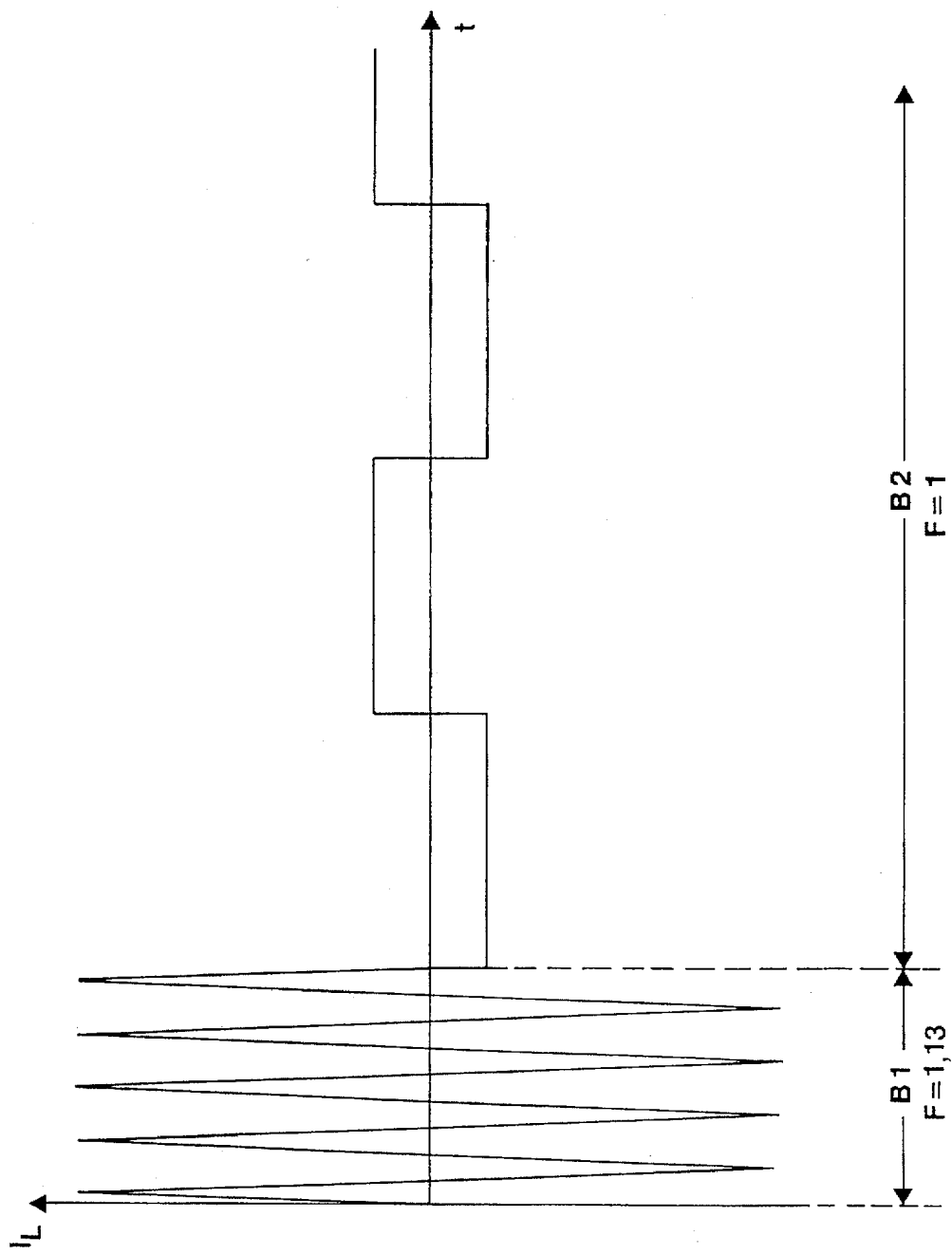
FIG. 3 is a schematic timing diagram of operating currents in different operating states or phases of the lamp, in accordance with the present invention.

FIG. 3 illustrates the course of the current in the first and second operating phases. In the first operating phase B1, the current due to the inductance L which operates linearly, and due to an increased operating frequency has approximately triangular wave shape, and hence a form factor F of 1.13. In the second operating phase B2, the current is square wave, since the bridge switching frequency is low, and thus has a form factor F of 1. Due to the non-linear characteristics of the inductance and the increasing operating frequency, the operating current may have a wave shape as shown in FIG. 4; this operating current with this wave shape has a form factor of 1.45. The second operating phase is identical with that of FIG. 3.

In the run-on operation, the operating frequency of the full-wave bridge S1–S4 is preferably selected to be at least one order of magnitude higher than the operating frequency, e.g. about 2 kHz, which is particularly applicable to the embodiment shown in FIG. 4. The non-linear inductance L, in unsaturated condition, may have an inductivity of, for example, 5 mH. At about 2 A operating current, the inductance drops to about 1/5, that is, to about 1 mH. The inductance can be switchable between a first and second value, L' and L". The relationship L'/L" can be formed by absolute values which, for example, are between 2 and 20.

The switches are shown only schematically; in actual circuits, semiconductor, especially transistor switches, will be used.

We claim:

1. A method to start and then operate a discharge lamp (EL) having a rated, nominal operating current
comprising the steps of:
starting the lamp in a first, or ignition phase;
then, during a second or run-up phase,
operating the lamp by supplying the lamp with a run-up phase current which has an effective value ($I_{eff1}$) which is higher than the rated effective value of the nominal operating current, and
wherein said run-up phase current supplied to the lamp has a form factor F greater than one or unity,
in which said form factor is defined as the ratio of effective current ($I_{eff1}$) to rectified value of the current ($I_{gl}$) supplied to the lamp; and
operating said lamp in a third, or normal operating phase subsequent to said second or run-up phase with alternating current of essentially square-wave shape, and having a form factor of essentially one or unity.

2. The method according to claim 1, wherein the current supplied to the lamp during said second or run-up phase has a small rectified value ($I_{gl}$).

3. An operating circuit for a discharge lamp to start the lamp, run-up the lamp and then operate the lamp at a rated nominal operating current in accordance with the method of claim 1 comprising
a switched bridge circuit (S1, S2, S3, S4) having switches in each one of the branches of the bridge;
an inductance (L), in series with said discharge lamp being coupled in a cross connection of said switched bridge circuit;
a switched-mode power supply circuit (SNT) connected to said switched bridge circuit for providing power to the switched bridge circuit and hence to the lamp;
a control circuit (C) for controlling operation of said switched bridge circuit,
said control circuit (C) controlling the switched mode power supply circuit (SNT) to supply power for starting the lamp in a first, or starting phase;
then for supplying current to said lamp in the second, or run-up phase, for supplying the lamp with the run-up phase current of an effective value ($I_{eff}$) which is higher than said rated or nominal operating current; and
then for supplying to said lamp in the third, or normal operating phase subsequent to said second or run-up phase, the alternating current of essentially square-wave shape, and having a form factor of essentially one or unity; and
wherein said inductance (L) is constructed to control the wave shape of said run-up phase current, as supplied by said switched mode power supply circuit (SNT) to have a form factor F which is greater than one or unity.

4. The circuit of claim 3, wherein said switched mode power supply (SNT) controls the power supplied to the discharge lamp (EL).

5. The circuit of claim 3, wherein said control circuit (C) controls the switches (S1–S4) to operate at the frequency which is relatively high with respect to the frequency of the rated nominal operating current during the run-up phase, and changes the frequency of operation of said switches to rated operating frequency after said run-up phase.

6. The circuit of claim 5, wherein said control circuit (C) controls the switched-mode power supply (SNT) to provide, in the second run-up phase, power to the discharge lamp (EL) which is relatively higher than the nominal rated operating power, and in a third, or operating phase subsequent to said second operating phase, to supply lesser power corresponding to nominal power of the lamp.

7. The circuit of claim 4, wherein said inductance (L) is a non-linear inductance and so dimensioned that, in said second run-up phase, it is operated under saturated conditions.

8. The circuit of claim 7, wherein the non-linear inductance (L) is so dimensioned that, when current of a magnitude of between about twice to three times the effective value of the rated normal operating current passes therethrough, the non-linear inductance becomes saturated.

9. The circuit of claim 6, wherein the inductivity of said inductance (L) is switchable between a first value (L') and a second value (L").

10. The circuit of claim 9, wherein the inductivity of said inductance (L) is switched between said values as a function of current passing therethrough.

11. The circuit of claim 3, said firing or ignition means (Z) for the lamp includes an ignition circuit and inductively coupled with said inductance (L).

12. The circuit of claim 11, further including a capacity (CR) connected in parallel to the discharge lamp (EL).

13. The method of claim 1, wherein the frequency of the run-up phase current is higher by at least one order of magnitude than the frequency of the rated or normal operating current supplied to the lamp subsequent to said run-up phase.

14. A method to start and then operate a discharge lamp (EL) having a rated, nominal operating current comprising the steps of:

starting the lamp in a first, or ignition phase;

then, during a second or run-up phase, operating the lamp by supplying the lamp with a run-up phase current which has an effective value ($I_{eff1}$) which is higher than the rated effective value of the nominal operating current, and wherein said run-up phase current supplied to the lamp has a form factor F greater than one or unity, in which said form factor is defined as the ratio of effective current ($I_{eff1}$) to rectified value of the current ($I_{g1}$) supplied to the lamp wherein the frequency of the run-up phase current is higher than the frequency of the rated or normal operating current supplied to the lamp subsequent to said run-up phase.

* * * * *

UNITED STATES PATENT AND TRADEMARK OFFICE
CERTIFICATE OF CORRECTION

PATENT NO. : 5,742,132
DATED : April 21, 1998
INVENTOR(S) : HUBER et al.

It is certified that error appears in the above-identified patent and that said Letters Patent is hereby corrected as shown below:

Column 6, line 63 (claim 11, line 1), after "of claim 3," insert, --wherein--.

Signed and Sealed this

Twenty-third Day of March, 1999

Attest:

Q. TODD DICKINSON

*Attesting Officer*   *Acting Commissioner of Patents and Trademarks*